May 19, 1970  A. L. FOX  3,513,282

ELECTRODE FOR SPARK EROSION APPARATUS

Filed Sept. 19, 1966

Inventor
Austin Leslie Fox

By
Watson, Cole, Grindle + Watson
Attorneys

United States Patent Office 3,513,282
Patented May 19, 1970

---

3,513,282
ELECTRODE FOR SPARK EROSION APPARATUS
Austin Leslie Fox, London, England, assignor to Molins Machine Company Limited, London, SE. 8, England, a corporation of Great Britain
Filed Sept. 19, 1966, Ser. No. 580,441
Claims priority, application Great Britain, Sept. 22, 1965, 40,397/65
Int. Cl. B23p 1/04, 1/08
U.S. Cl. 219—69                2 Claims

ABSTRACT OF THE DISCLOSURE

An electrode for use in spark erosion apparatus comprises a main portion having a forward-facing working surface of desired contour and at least one laterally extending integral locating portion having a locating surface also facing forward, the locating portion including means such as perforations to permit lateral location of the electrode.

---

This invention relates to electrodes for use in spark erosion apparatus, and to methods of manufacture of such electrodes.

In recent times increasing use has been made of spark erosion techniques in the removal of metal from selected areas of workpiece surfaces. The process involves the confrontation of the workpiece surface with an electrode whose surface has a form complementary to that to be produced on the workpiece, and applying an electric potential difference between the electrode and workpiece sufficient to cause a spark to travel therebetween. The spacing between the workpiece and electrode must be maintained at a critically small value, and this is usually done by an automatic servo mechanism; usually the potential difference is applied intermittently and a dielectric liquid e.g. paraffin (kerosene) is circulated through the gap between the workpiece and the electrode. The process is of especial value when the workpiece surface is to be cut in complex patterns, difficult to produce by mechanical methods such as milling or grinding.

Hitherto, it has been common to produce the necessary electrodes (which require quite frequent replacement as they are also eroded in some measure by the spark) by electroplating a metal such as copper and/or nickel on to a master former, then removing the hollow electrode formed by the plated-on metal and filling its rear surface with a synthetic resin or other fusible material. The composite electrode thus produced has then required machining to produce an accurate front-to-back thickness, so that the front surface of the electrode is accurately positioned when it is secured with its back against a reference surface in the spark erosion apparatus.

It is an object of the present invention to provide an improved form of electrode for spark erosion apparatus permitting quicker and cheaper manufacture, and a method of manufacturing such improved electrodes.

According to the invention, there is provided an electrode for use in spark erosion apparatus, comprising a main portion having a forward-facing working surface of desired contour, and at least one locating portion integral with said main portion and having a locating surface also facing forward, said locating portion including means such as perforations to permit lateral location of said electrode.

Such an electrode may be quickly and cheaply produced by plating metal on to a master former as heretofore. However no subsequent filling or machining need be done, as the plating process may be so arranged as to give accurately-placed working and locating surfaces and the spark erosion apparatus may be arranged to hold such an electrode with the locating surfaces and locating means suitably engaged by reference surfaces and/or members.

According to a further feature of the invention, therefore, there is provided a method of making an electrode as set forth above, comprising the steps of making a master former having a forming surface with a main part of complementary form to the main portion of the electrode to be formed and at least one subsidiary part of complementary form to the locating portion of said electrode, and simultaneously plating metal on to said main and subsidiary parts to produce an electrode having its working and locating surfaces in predetermined relation.

As the forming surface is of complementary form to the electrode, it will be appreciated that the working and locating surfaces of the electrode will be composed of the metal first deposited during plating, i.e. most intimately associated with the forming surface. Accordingly, control of the thickness of plating is not at all critical, the only requirement being that sufficient metal should be plated, under appropriate conditions, to yield an electrode of at least a minimum thickness and strength, determined in each case by the circumstances in which the electrode is to be used.

The master former may be made, for example, of an epoxy resin and may be prepared for plating in conventional manner e.g. by coating with graphite.

An alternative method of producing electrodes embodying the invention is investment casting, e.g. the "lost wax" process, but at present it appears that in most cases this may be slower and more costly than the plating method defined above, due to the well-known phenomenon of internal stresses in castings leading to a need for aging and machining each casting.

In order that the invention may be well understood, a more detailed description of a preferred form of electrode embodying the invention and its manufacture will now be given, reference being made to the accompanying diagrammatic drawings in which.

As an arbitrary example, it is assumed that an electrode is required for use in a spark erosion apparatus to produce two recesses in a rectangular surface of a workpiece, one recess to be conical in form and the other recess to be a short cylindrical one.

Figure 1:
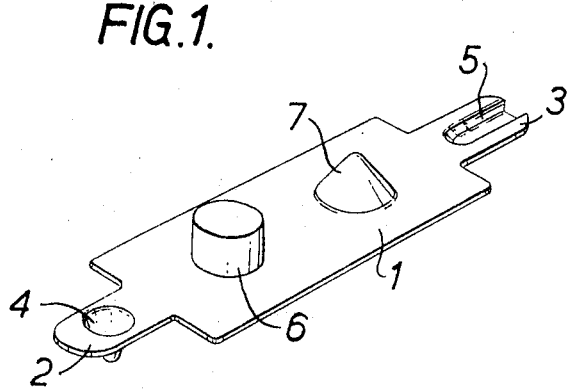
FIG. 1 is a perspective view of an electrode embodying the invention.

A suitable electrode embodying the invention is shown in FIG. 1. The electrode illustrated has a main portion 1 of rectangular form (corresponding to the form of the workpiece), and two locating portions in the form of extension tabs 2, 3 projecting symmetrically from the two shorter sides of the rectangular portion 1. The tab 2 has a conical depression 4 and the tab 3 an elongated groove 5, which depression and groove serve as means for lateral location of the electrode when fitted to a spark erosion apparatus, as will be described. The working i.e. forward surface of the main portion 1 is that visible in FIG. 1, and carries projections 6, 7 respectively of cylindrical and conical form and so positioned that the contour of said working surface is of complementary form to that desired to be produced in the workpiece when the electrode is in use. The forward surface of each tab 2, 3 is coplanar with the working surface of the main portion (other than the projections 6, 7). It will be apparent that, by pressing the forward surfaces of tabs 2, 3 against suitable fixed reference surfaces, and engaging locating lugs or the like in depression 4 and groove 5, the working surface of main portion 1 with its projections 6, 7 is precisely located both forwardly and laterally.

Figure 3:
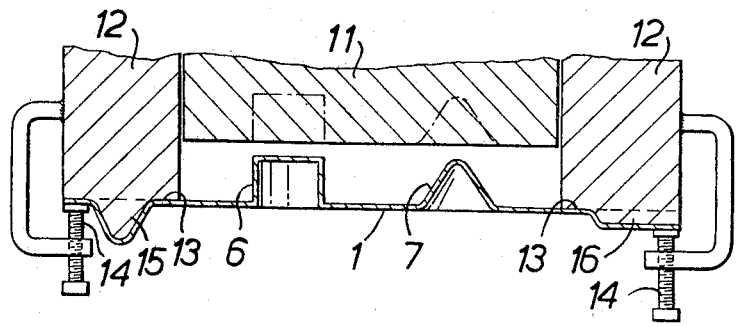
FIG. 3 shows the electrode of FIG. 1 in use in a spark erosion apparatus.

FIG. 3 shows the electrode of FIG. 1 in position in a spark erosion apparatus. It will be seen that a workpiece 11 is secured in a predetermined position between two blocks 12, the said blocks being fixed parts of the apparatus and having reference surfaces 13 against which the forward surfaces of tabs 2, 3 of the electrode are held by clamping members 14. One of the blocks 12 has a small conical lug 15 in its reference surface 13, the lug 15 being received in depression 4 of tab 2, and the other block 12 has an elongated lug 16 received in groove 5 of tab 3. The electrode is thus located accurately in all dimensions, so that its working surface, carrying projections 6, 7, occupies a predetermined position in the apparatus, and is positioned as desired relative to the workpiece 11. Dashed lines on the workpiece indicate the recesses which will be formed in said workpiece when erosion is completed.

It should be noted that in FIG. 3 the spacing shown between the electrode and the workpiece is not intended to represent realistically the gap between these parts while spark erosion is being performed; as usual in the art, the apparatus will provide for maintenance of a critically small spacing between these elements.

Figure 2:
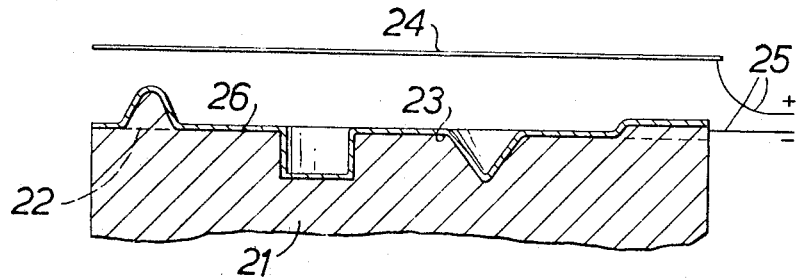
FIG. 2 is a sectional view of the electrode of FIG. 1 in the final stage of its manufacture.

FIG. 2 illustrates the manufacture of the electrode of FIGS. 1 and 3. In FIG. 2, there is shown a former member 21 of an epoxy resin having a top or working surface 22 corresponding to the form of electrode to be produced (FIG. 1). Said surface 22 is coated with an electrically-conductive material 23, e.g. graphite, and immersed in a plating bath of suitable electrolyte (not shown). An anode 24 is also placed in said bath, and an electric potential difference is applied between the coating 23 and the anode 24 via connecting leads 25 to cause electroplating of metal onto the surface 22 in conventional manner.

As shown in FIG. 2 the plating process is substantially complete. It will be seen that the electrode is formed as a plated coating 26 on the surface 22 of former member 21 and it may readily be removed therefrom. It will be understood that a variety of metals may be deposited by electroplating and the particular metal or metals selected in any given case will depend upon the requirements of the spark erosion operation to be performed, e.g. the composition of the workpiece to be eroded. Once the metal to be deposited has been selected, the composition of the electrolyte, current density, and other controlling parameters of the plating process may be selected in conventional manner.

The plating process need not be controlled to give an electrode whose thickness is within predetermined fine limits, as it will be understood that the working surface of the electrode is composed of the metal first deposited on the former member 21 and, therefore, the configuration of the whole working surface of the electrode, i.e. the main portion and the tabs, is accurately determined by the contour of the surface of member 21.

Various changes or modifications may be made in details of the elements and processing steps employed and it is therefore to be understood that the foregoing description, illustrated by the accompanying drawings, is by way of example only. For instance, although the tabs 2, 3 are shown and described as coplanar with the working surface of the main portion, this is not a necessary condition.

What I claim as my invention and desire to secure by Letters Patent is:

1. An electrode for use in spark erosion apparatus comprising a main portion having a forward-facing working surface of desired contour and two locating portions integral with said main portion and having locating surfaces also facing forward, said locating portions being in the form of tabs projecting symmetrically from opposite sides of the main portion, said locating portions including a conical depression in one of said tabs and an elongated groove in the other of said tabs for cooperation with a corresponding depression and groove in said spark erosion apparatus to permit lateral location of said electrode relative to said spark erosion apparatus.

2. Spark erosion apparatus comprising two reference surfaces, one of said reference surfaces having a conical depression therein and the other of said reference surfaces having an elongated groove therein, means for securing a workpiece in a predetermined position between said reference surfaces, an electrode comprising a main portion having a forward-facing working surface of predetermined contour and two locating portions integral with said main portion, having locating surfaces also facing forward, said locating portions being in the form of two tabs projecting from the sides of the main portion of the electrode, said tabs having a corresponding depression and groove respectively for cooperation with said reference surfaces and being positioned on said reference surfaces such that the working surface of said electrode is positioned accurately in said apparatus and relative to said workpiece.

References Cited
UNITED STATES PATENTS

| | | |
|---|---|---|
| 2,485,361 | 10/1949 | Condit et al. |
| 3,390,247 | 6/1968 | Webb. |
| 2,861,164 | 11/1958 | Stegler. |
| 2,885,529 | 5/1959 | Nelson. |
| 2,908,797 | 10/1959 | Stegler. |
| 3,035,151 | 5/1962 | Weglarz. |
| 3,244,852 | 4/1966 | Heterick et al. |
| 3,271,848 | 9/1966 | Montandon. |

R. F. STAUBLY, Primary Examiner

U.S. Cl. X.R.

204—143